(12) United States Patent
Ewanchuk et al.

(10) Patent No.: US 10,122,786 B2
(45) Date of Patent: Nov. 6, 2018

(54) ELECTRONIC DEVICE AND METHOD OF MANAGING DATA TRANSFER

(71) Applicant: BlackBerry Limited, Waterloo (CA)

(72) Inventors: Andrew John Ewanchuk, Baden (CA); Ronesh Puri, Dundas (CA); David Andrew Brown, Waterloo (CA); Cody Stephen Bryant, Waterloo (CA)

(73) Assignee: BlackBerry Limited, Waterloo (CA)

( * ) Notice: Subject to any disclaimer, the term of this patent is extended or adjusted under 35 U.S.C. 154(b) by 421 days.

(21) Appl. No.: 14/925,851

(22) Filed: Oct. 28, 2015

(65) Prior Publication Data

US 2017/0126778 A1 May 4, 2017

(51) Int. Cl.
*G06F 15/16* (2006.01)
*H04L 29/08* (2006.01)
*H04W 76/10* (2018.01)
*H04W 28/02* (2009.01)

(52) U.S. Cl.
CPC ......... *H04L 67/06* (2013.01); *H04W 28/0247* (2013.01); *H04W 76/10* (2018.02)

(58) Field of Classification Search
CPC .... H04L 67/06; H04W 28/0247; H04W 76/02
See application file for complete search history.

(56) References Cited

U.S. PATENT DOCUMENTS

| 7,536,440 | B2 | 5/2009 | Budd et al. |
| 9,055,387 | B1 | 6/2015 | Boyle et al. |
| 2006/0077949 | A1 | 4/2006 | Allen et al. |
| 2010/0011052 | A1* | 1/2010 | Gharabally ........ H04N 1/00204 709/203 |
| 2011/0131299 | A1* | 6/2011 | Sardary ................ G11B 27/034 709/219 |
| 2017/0318602 | A1* | 11/2017 | Wang ................ H04W 72/1263 |

OTHER PUBLICATIONS

Extended European Search Report dated Feb. 8, 2017 issued on the corresponding European application No. 16193926.9.
J De Winter, "SMTP Service Extension for Remote Message Queue Starting; RFC 1985.txt" Network Working Group RFC 1717, Wild bear Consulting, Inc., Aug. 1, 1996, 8 Pages.
European Patent Application No. 16193926.9, Office Action dated Feb. 2, 2018.
European Patent Application No. 16193926.9, Office Action dated Jun. 1, 2018.

\* cited by examiner

*Primary Examiner* — Viet D Vu
(74) *Attorney, Agent, or Firm* — Borden Ladner Gervais LLP; Geoffrey deKleine

(57) ABSTRACT

A method of managing data transfer from a server to a portable electronic device via a network includes, by the portable electronic device, initiating data transfer to the portable electronic device, identifying a network connection type by the portable electronic device to the network; setting, by the portable electronic device, a filter size for data record transmission to the portable electronic device, the filter size set based on the network connection type, and requesting, by the portable electronic device, a quantity of data records from the server. The quantity of data records is a number of data records that is dependent on the filter size set based on the network connection type.

15 Claims, 3 Drawing Sheets

ELECTRONIC DEVICE AND METHOD OF MANAGING DATA TRANSFER

FIELD OF TECHNOLOGY

The present disclosure relates to electronic devices and the synchronization of personal information manager application records for storage on electronic devices.

BACKGROUND

Portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, wireless PDAs, and laptop computers with wireless communication capabilities.

Portable electronic devices such as PDAs or smart telephones are generally intended for handheld use and ease of portability. Cellular network connections are utilized in maintaining connectivity, for example, when a Wi-Fi network is not available. Thus, a cellular network is utilized for data transmission, for example, to transmit data such as email to portable electronic devices.

The number of messages received during any given period of time varies depending on a number of factors. During working hours, for example, hundreds of emails may be received at a portable electronic device. Thus, hundreds of emails may be received via a cellular network connection.

Improvements in management of PIM service synchronization via cellular network connections are desirable.

BRIEF DESCRIPTION OF THE DRAWINGS

Embodiments of the present disclosure will now be described, by way of example only, with reference to the attached figures, in which.

DETAILED DESCRIPTION

Figure 1:
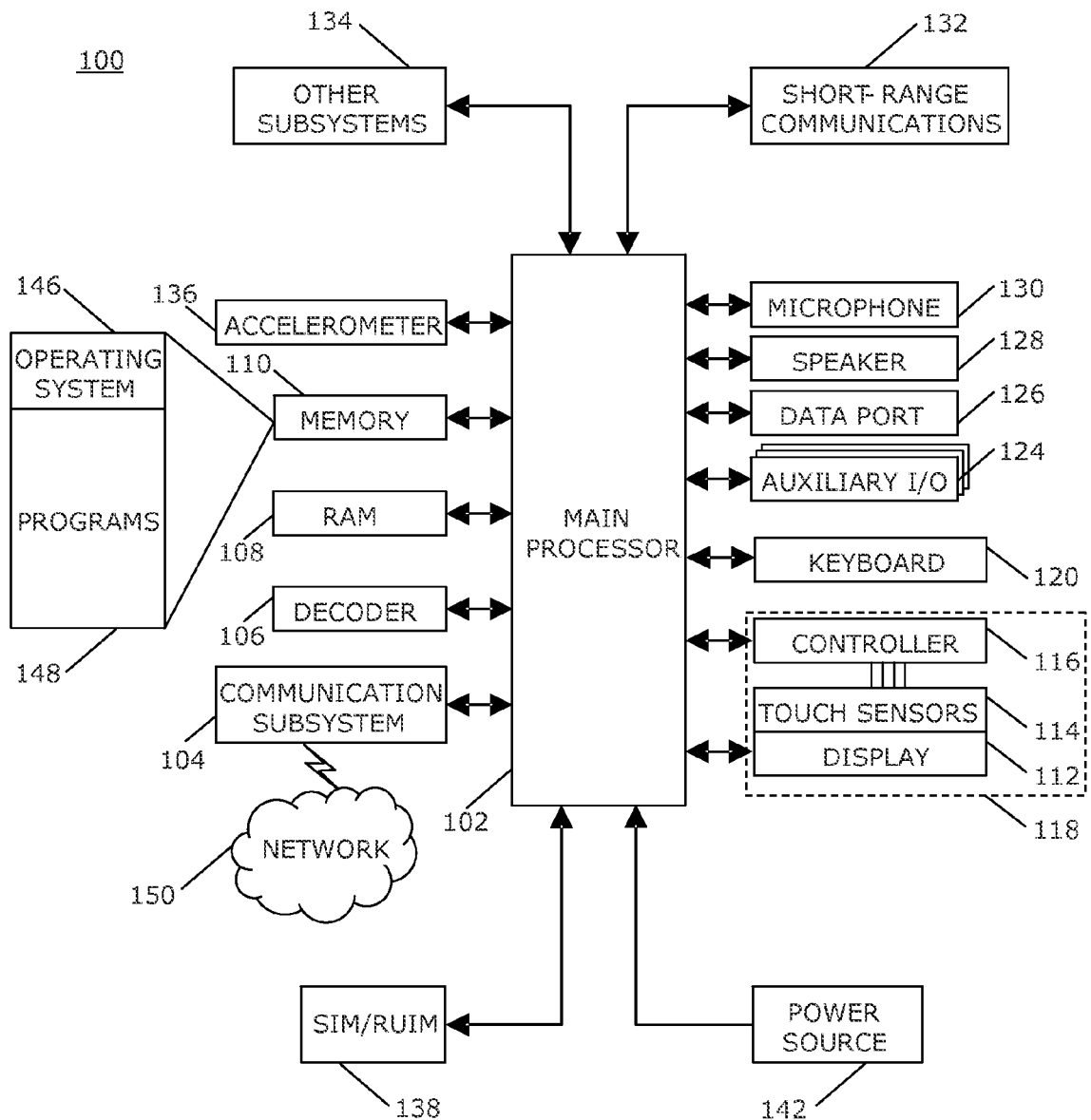
FIG. 1 is a block diagram of a portable electronic device in accordance with the present disclosure.

The following describes an electronic device and a method of managing data transfer from a server to a portable electronic device via a cellular network. The method includes, by the portable electronic device, initiating data transfer to the portable electronic device, identifying a cellular network connection type by the portable electronic device to the cellular network; setting, by the portable electronic device, a filter size for data record transmission to the portable electronic device, the filter size set based on the cellular network connection type, and requesting, by the portable electronic device, a quantity of data records from the server. The quantity of data records is a number of data records that is dependent on the filter size set based on the cellular network connection type.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

The disclosure generally relates to a portable electronic device. Examples of portable electronic devices include mobile, or handheld, wireless communication devices such as cellular phones, cellular smart-phones, wireless organizers, personal digital assistants, wirelessly enabled notebook computers, tablet computers, mobile internet devices, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including data wireless networks and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, a keyboard 120, an auxiliary input/output (I/O) subsystem 124, a data port 126, a speaker 128, a microphone 130, short-range communications 132 and other device subsystems 134. The speaker 128, also referred to as an earpiece speaker, is utilized to output audible signals when a user's ear is very close to the speaker 128. Although not shown, the processor may also interact with a loudspeaker, for example, for handsfree use. The keyboard 120 includes a plurality of keys, which may be mechanical keys that include mechanical switches or contacts for input to the electronic device 100 when a mechanical key of the keyboard is depressed by a sufficient amount to oppose a bias of the mechanical key. Alternatively, or in addition, the keys of the keyboard may include touch sensors coupled to a controller to detect touch input thereon.

The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display that includes a plurality of capacitive touch sensors 114. Capacitive touch sensors 114 include drive electrodes, also known as transmission electrodes, and sense electrodes, also known as receive electrodes. The drive electrodes generally extend in one direction and cross over or under the sense electrodes, which generally extend in another direction, generally at right angles to the direction that the drive electrodes extend, to form a grid pattern. The drive electrodes are spaced from the sense electrodes by a dielectric material. The points at which the drive electrodes and the sense electrodes cross each other are referred to as nodes. The drive and sense electrodes may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, or other objects, for example, a stylus, pen, or other pointer, depending on the nature of the touch-sensitive display 118. Multiple simultaneous touches may be detected.

By repeatedly scanning the electrodes of the touch-sensitive display 118 to detect touches, movement of a touch relative to the touch-sensitive display 118 may be detected. One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Figure 2:
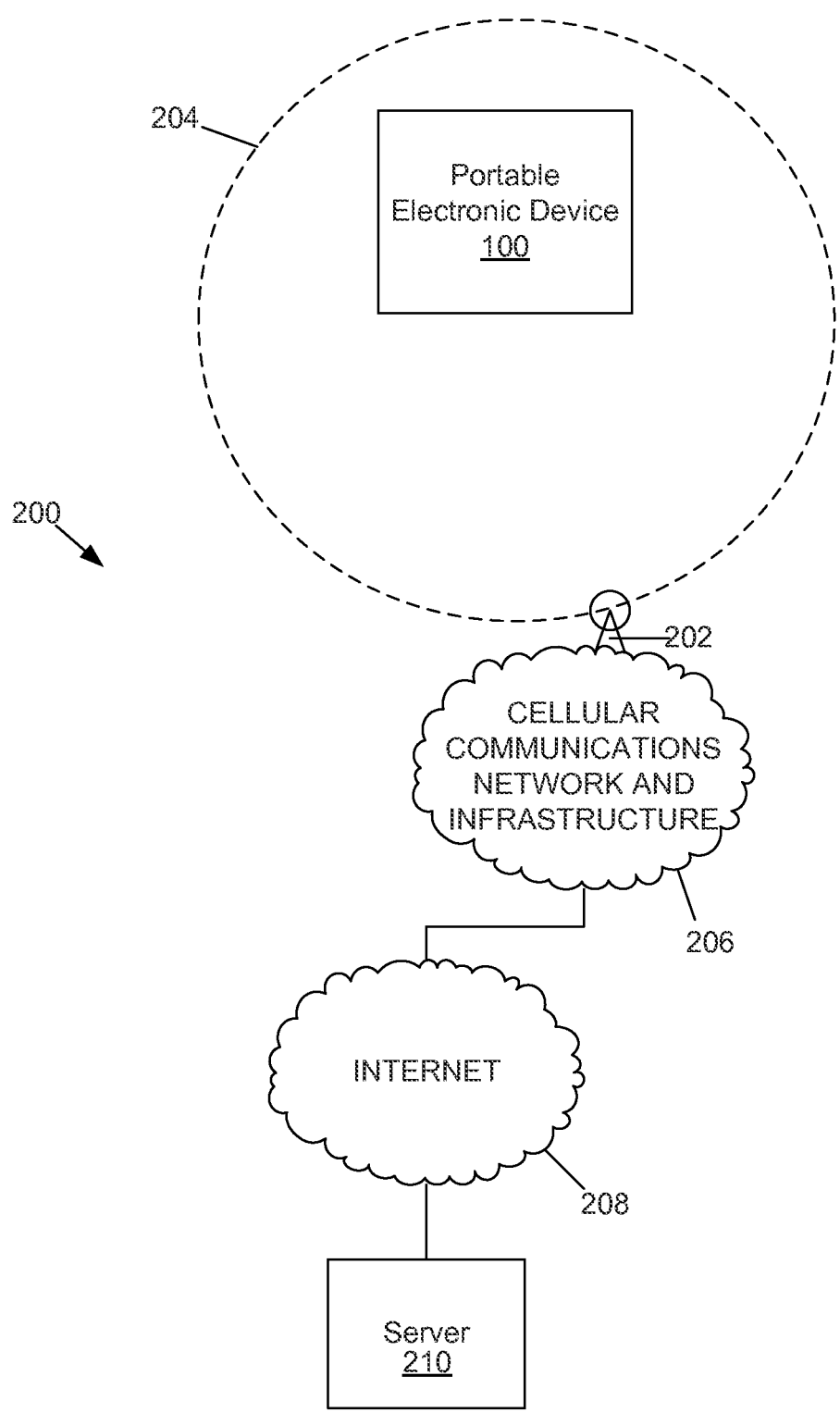
FIG. 2 is a functional block diagram of a portable electronic device in communication with a cellular communication system in accordance with the present disclosure.

A functional block diagram of one example of a cellular communication system in which the portable electronic device is utilized is shown in FIG. 2. The communication system is indicated generally by the numeral 200 and provides for communications with portable electronic devices including the portable electronic device 100, as shown. The portable electronic device 100 and the communication system 200 are operable to effect communications over a radio communications channel in a cellular communications network. Data originating at the portable electronic device 100 is communicated to the communication system 200 by way of the radio communications channel. Similarly, data originating at the communication system 200 is communicated from the communication system 200 to the portable electronic device 100 by way of the radio communications channel, thereby providing data to the portable electronic device 100.

For the purpose of illustration, the communication system 200 is functionally represented in FIG. 2 and a single cellular base station 202 is shown. The cellular base station 202 defines a coverage area, or cell 204 within which communications between the cellular base station 202 and the portable electronic device 100 are effectuated. The portable electronic device 100 is movable within the cell 204 and may be moved to coverage areas defined by other cells that are not illustrated in the present example. The communication system 200 includes the cellular base station 202 that is part of a cellular communication network and infrastructure 206 that provides a communications link to the portable electronic device 100. The cellular wireless network and infrastructure 206 includes a plurality of cellular base stations (not shown) that provide the other cells referred to above. Data is delivered to the portable electronic device 100 via wireless transmission from the cellular base station 202. Similarly, data is sent from the portable electronic device 100 via wireless transmission to the cellular base station 202.

The cellular communication network and infrastructure includes, for example, a dual-mode wireless network that supports both voice and data communications over the same physical cellular base stations, including the base station 202. The cellular communication network and infrastructure 206 is operatively coupled to the Internet 208, which in this example is functionally coupled to an enterprise server 210.

The enterprise server 210 may be any suitable server to facilitate synchronization of Personal Information Manager (PIM) services including email, contacts, calendar events, and other data with a portable electronic device 100, such as the portable electronic device 100. For example, the enterprise server 210 may be a Microsoft Exchanger™ server including Exchange ActiveSync™.

Thus, the server 210 facilitates synchronization of Personal Information Manager (PIM) services including email records, contacts, calendar event records, and other data from an enterprise or business with the portable electronic device 100. Alternatively, a personal PIM service may be maintained in association with an Internet server rather than an enterprise server.

Figure 3:
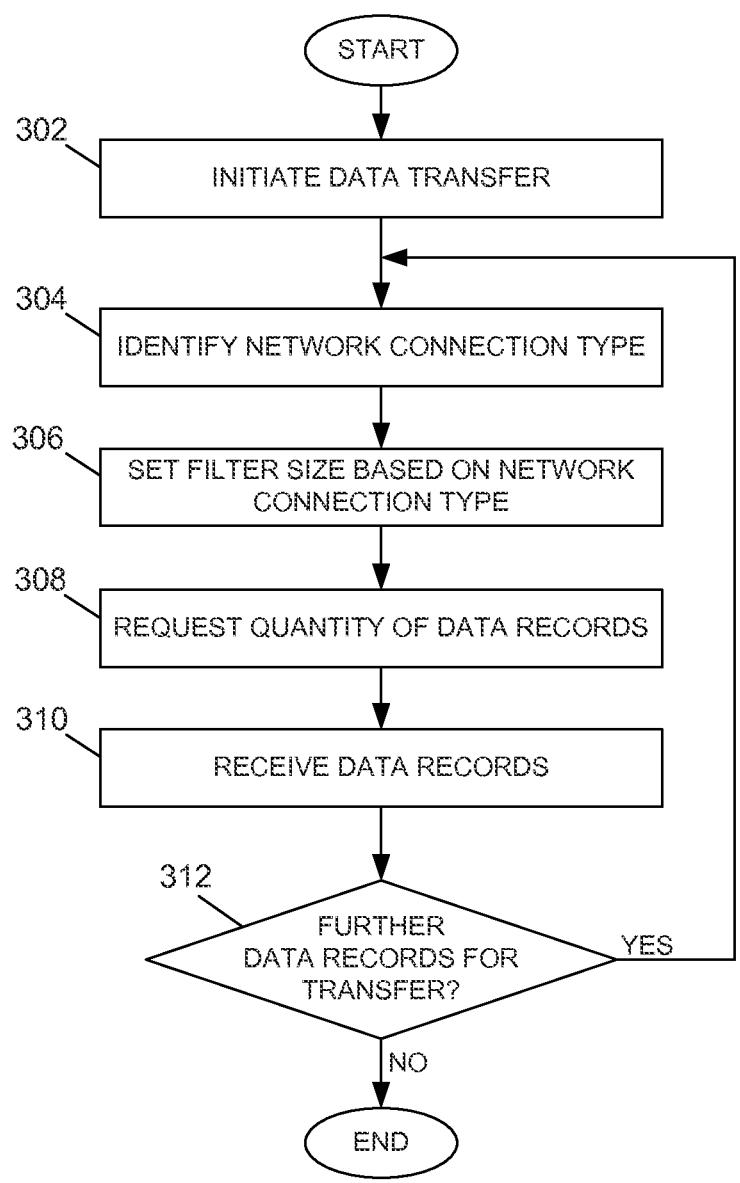
FIG. 3 is a flowchart illustrating a method of managing data transfer from a server to a portable electronic device via a cellular network in accordance with the present disclosure.

A flowchart illustrating a method of managing data transfer from a server, such as the enterprise server 210, to a portable electronic device, such as the portable electronic device 100 via a cellular network is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor 102 of the portable electronic device 100 to perform the method may be stored in a computer-readable storage medium, such as a non-transitory computer-readable medium.

The portable electronic device 100 initiates data transfer to the portable electronic device 100 at 302 to synchronize the PIM service records of a PIM service account with the data records stored in memory at the portable electronic device 100. The data transfer may be initiated as a result of an input received via, for example, the touch-sensitive display 118 or the keyboard 120, or any other input device. For example, the data transfer may be initiated by adding a personal information manager service account to the portable electronic device 100. When a personal information manager service account is added, data records, which may include calendar data records, email messages, contacts, or any other suitable data records, from the personal information manager service account are added to a database or other data storage, for example, in the memory 110 on the portable electronic device 100.

Alternatively, the data transfer at 302 may be initiated, for example, when communications such as a cellular network connection, are reestablished after a period in which no network connection was utilized or available. For example, a cellular network connection may be reestablished when communications are enabled after being disabled or turned off for a period of time, when the portable electronic device 100 is powered on after being powered off for a period of time, or when the portable electronic device 100 enters an area covered by the cellular communications network after a period of time of being out of the coverage areas of the cellular communications network.

In response to initiating the data transfer to the portable electronic device 100, the portable electronic device 100 at 304 identifies a network connection type. The network connection may be, for example, a 2G cellular network connection, 3G cellular network connection, 4G cellular network, connection, or Wi-Fi connection. The network connection type is determined to identify a quality of network connection. Data transmission utilizing a 3G, or $3^{rd}$ generation cellular network connection is significantly faster than data transmission utilizing a 2G cellular network connection. Similarly, a 4G cellular network connection is faster than data transmission utilizing a 3G cellular network connection. Data transmission utilizing a Wi-Fi connection is also faster than data transmission utilizing a 3G cellular network connection. Thus, the speed of transmission or download speed utilizing a 2G network connection is significantly slower than the download speed utilizing a 3G network connection, 4G network connection, or a Wi-Fi network connection.

A filter size is set based on the network connection type at 306. The filter size is utilized for data record transmission to the portable electronic device. The filter size is a number or quantity of data records that is requested by the portable electronic device 100 to transfer data records from a server, such as the enterprise server 210 to the portable electronic device 100. For example, the filter size may be a number of email messages requested in a single request from the portable electronic device 100 to the server 210.

The portable electronic device 100 sends a request at 308, via the network connection, for the quantity of data records from the server that is equivalent to the filter size set based on the network connection type. Thus, the number of data records that are requested in a single request from the portable electronic device 100 is dependent on the network connection type. The request is sent to the server, such as the server 210. For example, a request for 25 email messages may be sent to the server 210 when utilizing a 3G or a 4G cellular connection. On the other hand, fewer email messages, such as 5 email messages, may be sent to the server 210 when only a 2G cellular connection is established.

Thus the number of data records requested at a time is dependent on the filter size, which is set based on the network connection type. The number of data records requested may therefore be reduced for poor or lower quality connections, such as 2G cellular connections. A greater number of data records are requested for a higher quality connection, such as a 3G cellular connection. By reducing the number of data records requested at a time when connection quality is poorer, i.e., slower, the chance of a timeout error occurring during synchronization of data records is reduced.

The data records requested are then sent to the portable electronic device 100 and are received at the portable electronic device 100 at 310. When the data records requested and all of the data records are transferred to complete the data transfer from the server at 312, the process ends. When the data records requested are transferred and other data records are still to be transferred from the server to complete the data transfer, the process returns to 304 and the network connection 304 is again identified prior to setting the filter size and requesting further data records from the server.

One example of a method of managing data transfer from a server, such as the enterprise server 210, to a portable electronic device, such as the portable electronic device 100 via a cellular network is described with continued reference to FIG. 2 and FIG. 3.

The portable electronic device 100 initiates data transfer to the portable electronic device 100 at 302 to synchronize email messages from an email account managed at the enterprise server 210. For the purpose of this example, the data transfer is initiated when cellular communications are reestablished after the portable electronic device 100 is out of cellular communications range for a period of time and no Wi-Fi connection is available.

In response to initiating the data transfer to the portable electronic device 100, the portable electronic device 100 identifies the cellular network connection type as a 2G cellular network connection at 304. A filter size is set at 5 emails at 306 and the portable electronic device 100 sends a request for 5 emails to the enterprise server 210 at 308.

The data records requested are received at the portable electronic device 100, from the enterprise server 210, at 310. Further data records remain at the enterprise server 210 for transfer to the portable electronic device 100. Thus, at 312, the process continues at 304. The portable electronic device 100 again identifies the cellular network connection as a 2G cellular network connection type. A filter size is again set at 5 emails at 306 and the portable electronic device 100 sends a further request for 5 further emails from the enterprise server 210 at 308.

The further data records requested are received at the portable electronic device 100 at 310. In response to determining that no further data records remain at the enterprise server 210 for transfer to the portable electronic device 100, the process ends.

According to another example, the portable electronic device 100 initiates data transfer to the portable electronic device 100 at 302 to synchronize email messages from an email account managed at the enterprise server 210. For the purpose of this example, the data transfer is initiated when no Wi-Fi connection is available and cellular communications are reestablished after being disabled for a period of time, for example, after turning off an airplane mode in which communications are disabled.

In response to initiating the data transfer to the portable electronic device 100, the portable electronic device 100 at 304 identifies 4G cellular network connection type. A filter size is set at 25 emails at 306 and the portable electronic device 100 sends a request for 25 emails from the enterprise server 210 at 308.

The data records requested are received at the portable electronic device 100 at 310. In response to determining that no further data records remain at the server 210 for transfer to the portable electronic device 100, the process ends.

Advantageously, a fewer number of data records is requested at a time when connection quality is poorer, i.e., slower, by comparison to the number of data requested when a better connection quality or faster connection is utilized. Thus, the chance of a timeout error occurring during synchronization of data records when utilizing a slower speed connection is reduced. All data records are still received at the portable electronic device 100. Thus, all email messages, calendar data records, contacts, or other suitable data records are resident and accessible by the portable electronic device while reducing the chance of a timeout error occurring during data transfer.

The scope of the claims should not be limited by the preferred embodiments set forth in the examples, but should be given the broadest interpretation consistent with the description as a whole.

What is claimed is:

1. A method of managing data transfer from a server to a portable electronic device via a cellular network, the method comprising:
   by the portable electronic device, initiating data transfer to the portable electronic device;
   identifying a network connection type by the portable electronic device to the cellular network;
   setting, by the portable electronic device, a filter size identifying a quantity of data records for data record transmission to the portable electronic device, the filter size set based on the network connection type; and
   requesting, by the portable electronic device, the quantity of data records from the server,
   wherein the quantity of data records is a number of data records that is dependent on the filter size set based on the network connection type such that the number of data records requested is dependent on the network connection type;
   receiving the quantity of data records at the portable electronic device, the quantity dependent on the filter size set based on the network connection type;
   repeating requesting, by the portable electronic device, the quantity of data records from the server and receiving the quantity of data records at the portable electronic device, until all data records for the portable electronic device are received at the portable electronic device.

2. The method according to claim 1, wherein identifying the network connection type comprises identifying a cellular data connection quality.

3. The method according to claim 2, wherein identifying the network connection type comprises identifying a generation of a cellular network connection.

4. The method according to claim 1, wherein setting the filter size for data record transmission comprises setting a number of email messages for request.

5. The method according to claim 1, wherein initiating data transfer to the portable electronic device comprises adding a personal information manager service account to the portable electronic device and adding data records from the personal information manager service account to a storage on the portable electronic device.

6. The method according to claim 1, wherein initiating data transfer to the portable electronic device comprises re-establishing communications by establishing a cellular network connection.

7. The method according to claim 1, wherein the data transfer is initiated with a Wi-Fi connection is not available.

8. A non-transitory computer-readable medium having computer-readable code stored thereon, the computer-readable code executable by at least one processor of a portable electronic device to perform the method according to claim 1.

9. A portable electronic device comprising:
   a memory for data storage;
   a display for displaying information thereon;
   an input device; and
   a communications subsystem for receiving data at and sending data from the portable electronic device; and
   a processor operably coupled to the memory, the display, the input device; and
   the communications subsystem, and configured to:
     initiate data transfer to the portable electronic device in response to receipt of an input from the input device;
     identify a network connection type by the portable electronic device to a network;
     set a filter size identifying a quantity of data records for data record transmission to the portable electronic device, the filter size set based on the network connection type; and
     request the quantity of data records from a server,
     wherein the quantity of data records is a number of data records that is dependent on the filter size set based on the network connection type such that the number of data records requested is dependent on the network connection type;
     receive the quantity of data records at the portable electronic device, the quantity dependent on the filter size set based on the network connection type;
     repeat requesting, by the portable electronic device, the quantity of data records from the server and receiving the quantity of data records at the portable electronic device, until all data records for the portable electronic device are received at the portable electronic device.

10. The electronic device according to claim 9, wherein the network connection type is identified by identifying a cellular data connection quality.

11. The electronic device according to claim 9, wherein the network connection type is identified by identifying a generation of a cellular network connection.

12. The electronic device according to claim 9, wherein the filter size for data record transmission comprises a number of email messages for request.

13. The electronic device according to claim 9, wherein initiation of data transfer to the portable electronic device comprises an addition of a personal information manager service account to the portable electronic device and adding data records from the personal information manager service account to a storage in the memory of the portable electronic device.

14. The electronic device according to claim 9, wherein initiation of data transfer to the portable electronic device is in response to re-establishing communications by the cellular network connection.

15. The electronic device according to claim 9, wherein the data transfer is initiated with a Wi-Fi connection is not available.

\* \* \* \* \*